(12) United States Patent
Lei et al.

(10) Patent No.: US 11,452,141 B2
(45) Date of Patent: Sep. 20, 2022

(54) TECHNIQUES FOR FORMATTING RANDOM ACCESS MESSAGES IN WIRELESS COMMUNICATIONS

(71) Applicant: QUALCOMM Incorporated, San Diego, CA (US)

(72) Inventors: Jing Lei, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/785,345

(22) Filed: Feb. 7, 2020

(65) Prior Publication Data
US 2020/0288504 A1 Sep. 10, 2020

Related U.S. Application Data

(60) Provisional application No. 62/813,441, filed on Mar. 4, 2019.

(51) Int. Cl.
*H04W 72/14* (2009.01)
*H04W 74/08* (2009.01)
*H04W 72/04* (2009.01)

(52) U.S. Cl.
CPC ..... *H04W 74/0833* (2013.01); *H04W 72/042* (2013.01); *H04W 72/14* (2013.01)

(58) Field of Classification Search
CPC ............. H04W 74/0833; H04W 72/14; H04W 72/042
See application file for complete search history.

(56) References Cited

U.S. PATENT DOCUMENTS

| | | | |
|---|---|---|---|
| 2018/0198646 A1* | 7/2018 | Gau | H04W 56/0015 |
| 2018/0205516 A1* | 7/2018 | Jung | H04W 74/0833 |
| 2018/0234839 A1* | 8/2018 | Tenny | H04W 12/10 |
| 2018/0279186 A1* | 9/2018 | Park | H04W 36/30 |
| 2018/0279375 A1* | 9/2018 | Jeon | H04W 74/0833 |
| 2018/0279376 A1* | 9/2018 | Dinan | H04W 52/50 |
| 2019/0132066 A1* | 5/2019 | Park | H04B 17/309 |
| 2019/0132882 A1* | 5/2019 | Li | H04L 27/2605 |
| 2020/0100297 A1* | 3/2020 | Agiwal | H04L 5/0048 |
| 2020/0100299 A1* | 3/2020 | Loehr | H04W 76/11 |

(Continued)

FOREIGN PATENT DOCUMENTS

| | | |
|---|---|---|
| EP | 3518605 A1 | 7/2019 |
| WO | 2018054163 A1 | 3/2018 |
| WO | WO-2018175809 A1 * | 9/2018 ........ H04W 36/0077 |

OTHER PUBLICATIONS

NPL-CATT, "Consideration on 2-step RA", R2-1700205, 3GPP TSG RAN WG2 Meeting Ad Hoc, Jan. 17-19, 2017, pp. 1-6 (Year: 2017).*

(Continued)

*Primary Examiner* — Lan-Huong Truong
(74) *Attorney, Agent, or Firm* — Arent Fox, LLP

(57) ABSTRACT

Aspects described herein relate to transmitting, to a base station, a random access message in a two-step random access procedure, and receiving, from the base station, a response message for the random access message in the two-step random access procedure, wherein the response message is formatted based at least in part on at least one of a use case associated with the random access message and whether the random access message is successfully received.

31 Claims, 7 Drawing Sheets

(56) References Cited

U.S. PATENT DOCUMENTS

| | | | |
|---|---|---|---|
| 2020/0107372 A1* | 4/2020 | Agiwal | H04W 80/02 |
| 2020/0137803 A1 | 4/2020 | Fakoorian et al. | |
| 2020/0146069 A1* | 5/2020 | Chen | H04W 76/11 |

OTHER PUBLICATIONS

3GPP TSG-RAN WG1 #96, Athens, Greece, Date Feb. 25-Mar. 1, 2019; Source: Nokia Shanghai Bell, Title "On 2-steps RACH Procedure" (Year: 2019).*

3GPP TSG-RAN WG1 #96, Athens, Greece, Date Feb. 25-Mar. 1, 2019; Source: Nokia Shanghai Bell, Title "On 2-steps RACH Procedure", R1-1902136 (Year: 2019).*

Huawei, et al., "Discussion on 2-step RACH Procedure", 3GPP Draft, R1-1903057, 3GPP TSG RAN WG1 Meeting #96, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600753, 4 pages Retrieved from the Internet: URL: http://www.3gpp.org/ftp/tsg%5Fran/WG1%5FRL1/TSGR1%5F96/Docs/R1%2D1903057%2Ezip. [retrieved on Feb. 16, 2019] p. 1. paragraph 2.1-p. 2.

International Search Report and Written Opinion—PCT/US2020/017484—ISA/EPO—dated Apr. 24, 2020.

Mediatek Inc: "2-step RACH msgA and msgB contents", 3GPP Draft, R2-1816685, 3GPP TSG-RAN WG2 Meeting #104, 2-step RACH msgA and msgB contents, 3rd Generation Partnership Project (3GPP), Mobile Competence Center, 650, Route Des Lucioles, F-06921 Sophia-Antipolis Cedex, France, vol. RAN WG2, No. Spokane, US, Nov. 12, 2018-Nov. 16, 2018, Nov. 12, 2018 (Nov. 12, 2018), XP051556254, 7 pages, Retrieved from the Internet: URL: http://www.3gpp.org/ftp/Meetings%5F3GPP%5FSYNC/RAN2/Docs/R2%2D1816685%2Ezip. [retrieved on Nov. 12, 2018] section 2.1; p. 2.).

Mediatek Inc: "Further Considerations on 2-step RACH", 3GPP Draft, 3GPP TSG-RAN WG2 Meeting #103bis, R2-1813965 Further Considerations on 2-Step RACH, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 27, 2018 (Sep. 27, 2018), XP051523430, 7 Pages, Retrieved from the Internet: URL: http://www.3gpp.org/ftp/tsg%5Fran/WG2%5FRL2/TSGR2%5F103bis/Docs/R2%2D1813965%2Ezip [retrieved on Sep. 27, 2018], the whole document.).

Nokia, et al., "On 2-step RACH Procedure", 3GPP Draft, R1-1902136, 3GPP TSG RAN WG1 #96, On 2-step RACH Procedure, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599831, 10 pages, Retrieved from the Internet: URL: http://www.3gpp.org/ftp/tsg%5Fran/WG1%5FRL1/TSGR1%5F96/Docs/R1%2D1902136%2Ezip. [retrieved on Feb. 15, 2019] p. 2; figure 2 p. 2, paragraph 2.2-p. 3, paragraph 2.3.).

ZTE, et al., "Considerations on 2-Step RACH Procedures", 3GPP Draft, R1-1901627, 3GPP TSG RAN WG1 Meeting #96, Considerations on 2-Step RACH Procedures, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599324, 11 pages, Retrieved from the Internet: URL http://www.3gpp.org/ftp/tsg%5Fran/WG1%5FRL1/TSGR1%5F96/Docs/R1%2D1901627%2Ezip. [retrieved on Feb. 16, 2019] p. 1; figure 1 p. 2, paragraph 2.1 p. 4, paragraph 3.1 p. 8. paragraph 3.5-p. 9.).

ZTE: "Summary of 7.2.1.2 Procedure for Two-step RACH", 3GPP TSG RAN WG1 #96, R1-1903436, Athens, Greece, Feb. 25-Mar. 1, 2019, Mar. 3, 2019 (Mar. 3, 2019), Retrieved from the Internet: URL: http://www.3gpp.org/ftp/tsg%5Fran/WG1%5FRL1/TSGR1%5F96/Docs/R1%2D1903436%2Ezip, [retrieved on Mar. 3, 2019], 12 pages, sections 1-3, the Section 2.3.

* cited by examiner

TECHNIQUES FOR FORMATTING RANDOM ACCESS MESSAGES IN WIRELESS COMMUNICATIONS

CLAIM OF PRIORITY UNDER 35 U.S.C. § 119

The present application for Patent claims priority to Provisional Application No. 62/813,441, entitled "TECHNIQUES FOR FORMATTING RANDOM ACCESS MESSAGES IN WIRELESS COMMUNICATIONS" filed Mar. 4, 2019, which is assigned to the assignee hereof and hereby expressly incorporated by reference herein for all purposes.

BACKGROUND

Aspects of the present disclosure relate generally to wireless communication systems, and more particularly, to formatting messages in random access procedures. Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can use a random access procedure to establish a connection with a base station. A random access procedure can typically include four steps of messages communicated between the UE and base station to establish the connection. Recent proposals have introduced a two-step random access procedure where the UE transmits a first message including a random access preamble and a payload in a shared random access occasion, and the base station receiving the first message can transmit a second message including a random access response (e.g., to the random access preamble) and contention resolution information. The first message can include two separate transmissions (e.g., in time) of the preamble and payload portions of the message, and the gap between the preamble transmission and the payload transmission can be configurable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication, by a user equipment (UE), is provided. The method includes transmitting, by the UE to a base station, a random access message in a two-step random access procedure, and receiving, from the base station, a response message for the random access message in the two-step random access procedure, wherein the response message is based at least in part on a radio resource control (RRC) state of the UE and a use case associated with the random access message.

In another aspect, a method for wireless communications is provided. The method includes receiving, from a UE, a transmission of a random access message in a two-step random access procedure, and transmitting, to the UE, a response message for the random access message in the two-step random access procedure, wherein the response message is based at least in part on a radio resource control (RRC) state and a use case associated with the random access message.

In another aspect, an apparatus for wireless communication is provided that includes a transceiver, a memory configured to store instructions, and one or more processors communicatively coupled with the transceiver and the memory. The one or more processors are configured to transmit, to a base station, a random access message in a two-step random access procedure, and receive, from the base station, a response message for the random access message in the two-step random access procedure, wherein the response message is formatted based at least in part on a use case associated with the random access message and whether the random access message is successfully received.

In another aspect, an apparatus for wireless communication is provided that includes a transceiver, a memory configured to store instructions, and one or more processors communicatively coupled with the transceiver and the memory. The one or more processors are configured to receive, from a UE, a transmission of a random access message in a two-step random access procedure, and transmit, to the UE, a response message for the random access message in the two-step random access procedure, wherein the response message is formatted based at least in part on a use case associated with the random access message and whether the random access message is successfully received.

In another aspect, an apparatus for wireless communication is provided that includes means for transmitting, to a base station, a random access message in a two-step random access procedure, and means for receiving, from the base station, a response message for the random access message in the two-step random access procedure, wherein the response message is formatted based at least in part on a use case associated with the random access message and whether the random access message is successfully received.

In another aspect, an apparatus for wireless communication is provided that includes means for receiving, from a UE, a transmission of a random access message in a two-step random access procedure, and means for transmitting, to the UE, a response message for the random access message in the two-step random access procedure, wherein the response message is formatted based at least in part on a use case associated with the random access message and whether the random access message is successfully received.

In another aspect, a computer-readable medium, including code executable by one or more processors for wireless communication by a UE, is provided. The code includes code for transmitting, by the UE to a base station, a random access message in a two-step random access procedure, and receiving, from the base station, a response message for the random access message in the two-step random access procedure, wherein the response message is formatted based at least in part on a use case associated with the random access message and whether the random access message is successfully received.

In another aspect, a computer-readable medium, including code executable by one or more processors for wireless communication, is provided. The code includes code for receiving, from a UE, a transmission of a random access message in a two-step random access procedure, and transmitting, to the UE, a response message for the random access message in the two-step random access procedure, wherein the response message is formatted based at least in part on a use case associated with the random access message and whether the random access message is successfully received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
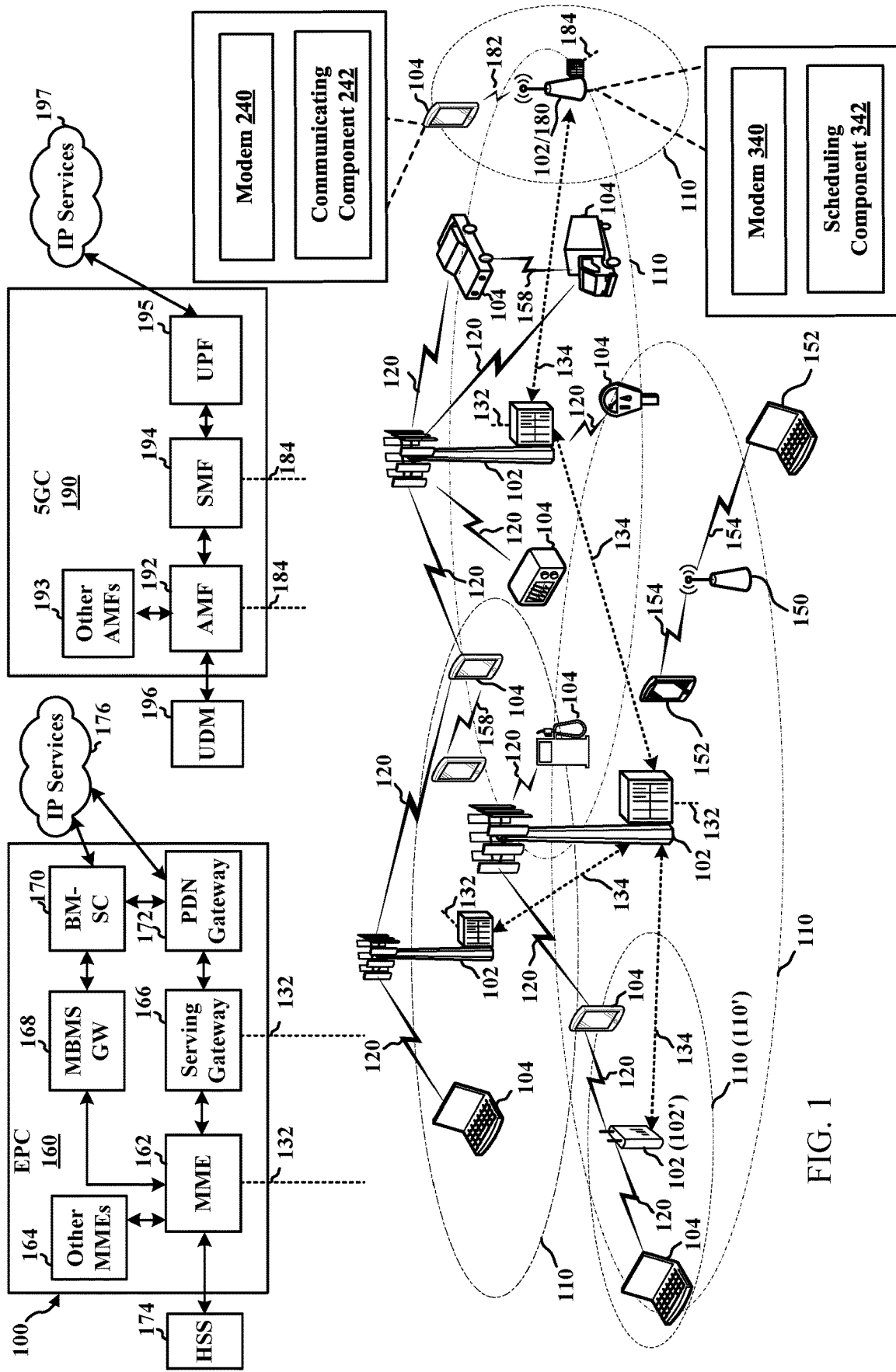
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communication of response messages, in response to an initial message, in a two-step random access procedure, though the concepts may be applied to random access procedures with more or less than two steps as well. In two-step random access procedures, a base station can broadcast signals with parameters for establishing a connection with the base station. Such signals may include a synchronization signal block (SSB), system information blocks (SIBs), reference signals (RSs), and/or the like. A user equipment (UE) can receive the broadcast signals and can synchronize with the downlink from the base station, perform system information decoding and measurement, and/or the like. In addition, the UE can determine, based on parameters in the broadcast signals, one or more random access occasions for transmitting random access messages over a random access channel (RACH) to establish a connection with the base station.

When the UE desires to establish a connection with the base station, the UE can transmit a first message of the two-step random access procedure, which may include a preamble portion and a payload portion (e.g., where the payload portion can include physical uplink shared channel (PUSCH) data), which can be referred to herein as "msgA," and these portions may be transmitted as separated by a transmission gap in time, and the payload portion may be transmitted without first receiving a response from the base station for the preamble portion. The base station can receive the first message (e.g., as the preamble and payload portions) and can transmit a response message to the UE, which can be referred to herein as "msgB," where the response message can include a random access response and/or contention resolution information. In an example, a two-step random access procedure can operate regardless of whether a UE has a valid timing advance (TA), can be applicable to many or all cell sizes, and/or can be applicable to various radio resource control (RRC) states (e.g., RRC_INACTIVE, RRC_CONNECTED, RRC_IDLE, etc.).

In an example, in two-step random access procedure (also referred to herein as two-step RACH), multiple UEs can share the same transmission occasion for msgA preamble and payload. Contents and payload size of msgA can be different. In an example, a small payload case may include RRC Connection/Resumption/Re-establishment Request Only, medium payload case may include UE status reports for capability/quality-of-service (QoS) etc., large payload case may include user plane (UP)/control plane (CP) data, as described further herein. Outcome of msgA detection/decoding can be different, in one example, such as both preamble and payload are successfully detected/decoded, only preamble is successfully detected, neither preamble nor payload is detected/decoded, etc. Described herein are aspects related to msgB design for two-step RACH, which can be able to provide efficient and flexible "random access response" and "contention resolution" solutions for different use cases (contents) of msgA, different outcome of msgA detection, different UE capabilities, etc.

Aspects described herein relate to determining a format for the response message based on one or more aspects of the first message. For example, the UE can transmit the first message according to different use cases, which may result in different sizes for the first message. In an example, the UE can transmit the first message to indicate a RRC state in a first use case, to additionally indicate a UE status report in a second use case, to additionally indicate uplink data in a third use case, and/or the like. Based on the use case and whether the preamble and payload portion of the message, or just the preamble portion, is received, the response message may be differently formatted to indicate different parameters, such as an uplink grant for resources to transmit uplink data, feedback for receiving (or not receiving) the payload portion of the first message, retransmission instructions or parameters to retransmit the payload portion only or both the preamble portion and the payload portion, etc. Based on the format of the response message, the UE may identify information for subsequent transmissions, including in some examples determining whether to retransmit a portion of the first message.

In an example, the RRC state and/or use case associated with the random access message can be used in determining a format for a response message, as described further herein. In addition, the outcome of detecting and/or decoding the random access message can be different in that both the preamble and payload portions may be successfully detected and/or decoded, only the preamble portion may be successfully detected and/or neither the preamble nor the payload portion may be successfully detected and/or decoded. This outcome can also be used to determine the format for the response message. Said differently, the format of a response message as received by a UE can be based on the RRC state, use case, outcome of detecting/decoding the random access message, etc. For example, the response message can be designed to provide an efficient and flexible random access response and/or contention resolution solution for different uses cases (contents) of the random access message, different outcomes of the random access message, and/or different UE capabilities.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting and/or retransmitting random access messages in a random access procedure. In addition, some nodes may have a modem 340 and scheduling component 342 for scheduling or otherwise enabling usage of resources for transmitting and/or retransmission random access messages, transmitting response messages to the random access messages, etc., as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can broadcast information related to transmitting random access messages, and communicating component 242 can process the broadcast information and accordingly transmit a random access message during a random access occasion. For example, the random access message may indicate an RRC state for the UE and/or additional information, based on a use case. Scheduling component 342 may additionally transmit, and communicating component 242 may receive, a response message for the random access message, which may be formatted based on the RRC state and/or the use case (and/or on whether the entire random access message is received or not) to include identifiers of UEs for which random access messages are received, uplink grants for one or more of the UEs, an indication to retransmit the random access message, and/or the like, as described further herein.

Figure 2:
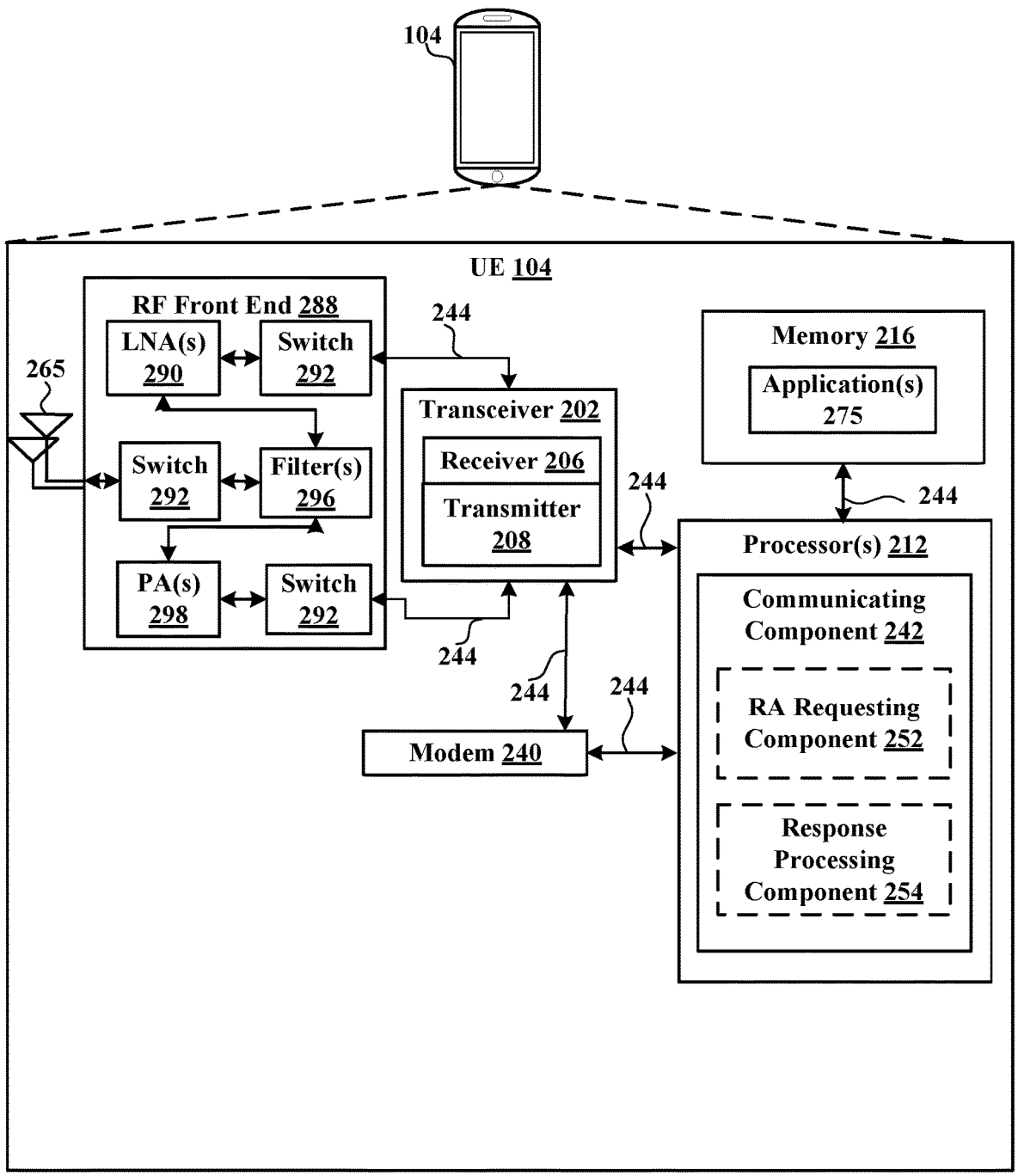
FIG. 2 is a block diagram illustrating an example of a UE, in accordance with various aspects of the present disclosure.
Figure 3:
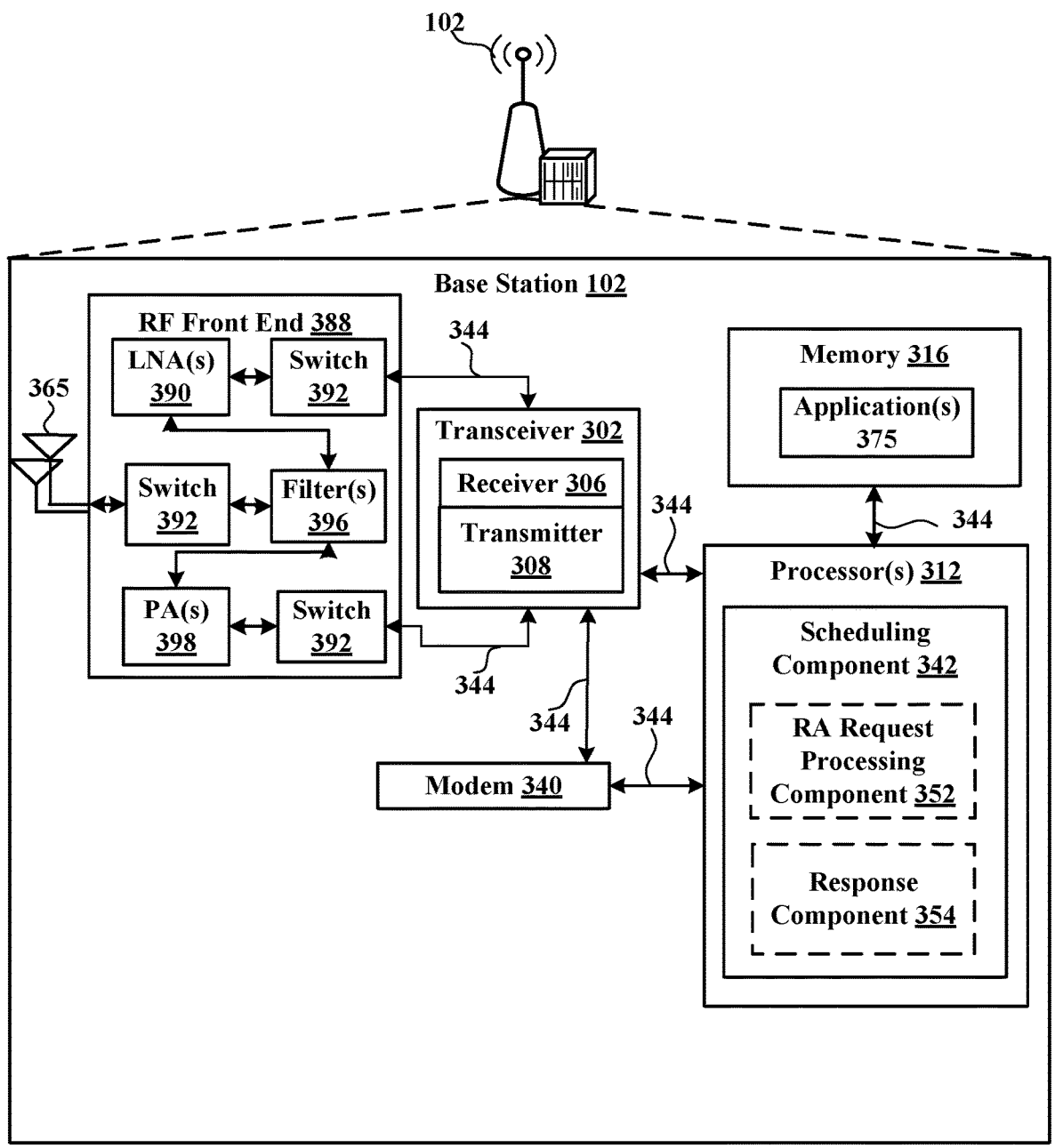
FIG. 3 is a block diagram illustrating an example of a base station, in accordance with various aspects of the present disclosure.
Figure 4:
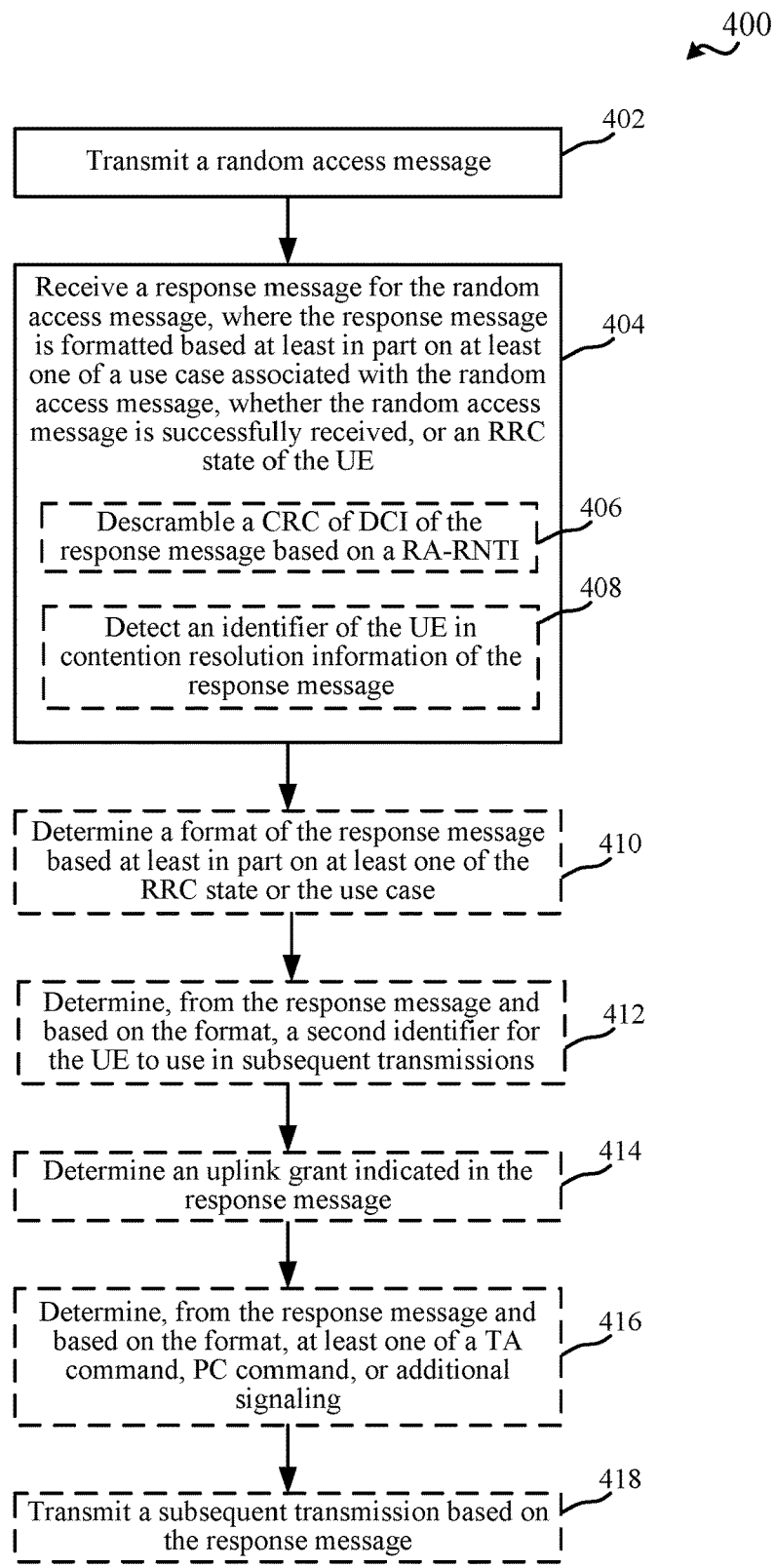
FIG. 4 is a flow chart illustrating an example of a method for transmitting random access messages, in accordance with various aspects of the present disclosure.
Figure 5:
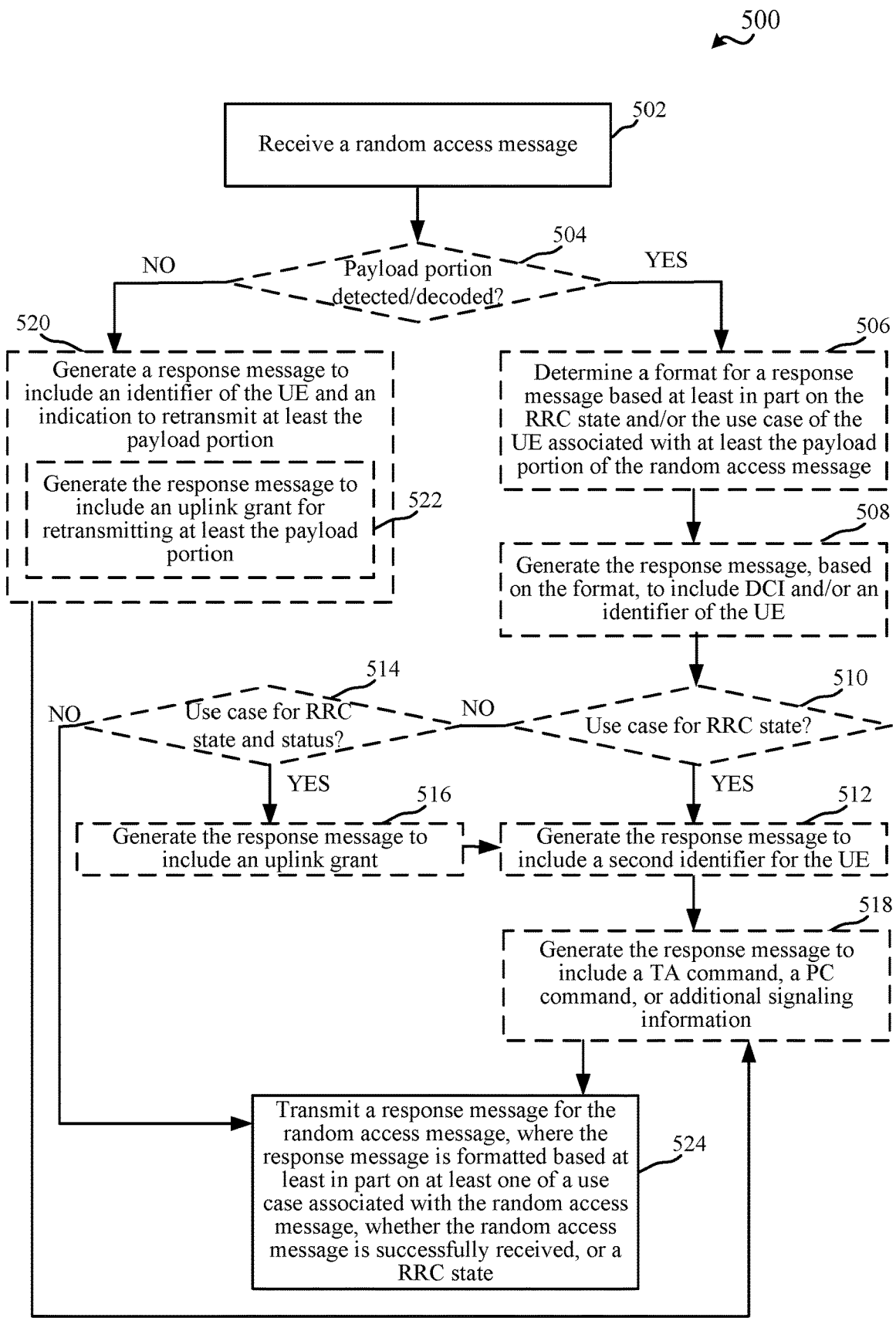
FIG. 5 is a flow chart illustrating an example of a method for transmitting response messages in response to random access messages, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting and/or retransmitting random access messages.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a RA requesting component 252 for transmitting a random access message to request access to a base station 102, and/or a response processing component 254 to process a response message from the base station 102 and/or transmit one or more subsequent messages based on the response message.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling or otherwise enabling usage of resources for transmitting and/or retransmitting random access messages, transmitting response messages to the random access messages, etc.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a RA request processing component 352 for processing a random access request message received from a UE 104 (e.g., to determine a RRC state and/or use case associated with the message), and/or a response component 354 to generate a response message for the random access message, where the response message may be based on the RRC state and/or use case and/or whether the entire random access message is successfully received and decoded (e.g., as opposed to only a preamble portion and not a payload portion).

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for transmitting a random access message. In an example, a UE 104 can perform the functions described in method 400 using one or more of the components described in FIGS. 1 and 2. FIG. 5 illustrates a flow chart of an example of a method 500 for transmitting a response to a random access message, and is described in conjunction with method 400 for ease of explanation, though the methods 400 and 500 are not required to be performed in conjunction. In one example, a UE 104 can perform the functions described in method 400 using one or more of the components described in FIGS. 1 and 2, and a base station 102 can perform the functions described in method 500 using one or more of the components described in FIGS. 1 and 3.

In method 400, optionally at Block 402, the UE can transmit a random access message. In an aspect, RA requesting component 252, e.g., in conjunction with processor(s) 212, memory 216, transceiver 202, communicating component 242, etc., can transmit (e.g., to base station 102) the random access message. For example, RA requesting component 252 can transmit the random access message in a random access occasion determined based on broadcast signaling received from a base station 102. For example, the random access occasion may be indicated and/or identified based on one or more parameters in the system information specifying a time period (or parameters from which a time period can be determined) for transmitting the random access message, frequency resources for transmitting the random access message, and/or the like. For example, the system information may indicate time and/or frequency resources for transmitting random access messages, such as random access preamble portions, corresponding payload portions, etc. In one example, the system information may indicate different time and/or frequency resources for transmitting different random access preambles and/or payloads, and/or in an example the random access preambles, payloads, associated resources, etc. may correspond to different beams of the base station 102 and/or that the UE 104 can use to transmit the random access preamble and/or payload.

In an example, the random access message can be a first message in a two-step random access procedure, and the random access message may include a preamble portion and a payload portion, as described. For example, the preamble portion may be similar to a RACH preamble defined in LTE/NR and the payload portion may include a PUSCH transmission of related PUSCH data. As described, the portions may be separately transmitted with a transmission gap in between, and the transmission gap may also be configured based on system information from the base station, in one example. In one example, where the random access preambles and/or associated time and/or frequency resources correspond to a beam, RA requesting component 252 can determine the random access preamble and/or associated time and/or frequency resources over which to transmit the random access preamble based at least in part on determining a beam to use in transmitting communications to the base station (e.g., based on determining a beam that is reciprocal to a beam received from the base station and having desirable signal properties).

In one example, the random access message may also be referred to herein as "msgA." The random access message may include various contents and/or be of one of various possible sizes. For example, RA requesting component 252 can transmit the random access message as part of a use case for requesting RA. In one example, the random access message may be part of a first use case having a small payload where the random access message can include a RRC state, such as a RRC connection, RRC resumption, RRC reestablishment, etc. request, and/or an identifier of the UE in the payload portion. In another example, the random access message may be part of a second use case having a medium payload where the random access message can additionally or alternatively include a UE status report (e.g., buffer status report (BSR), power headroom report (PHR), UE capability indication, QoS, etc.) in the payload portion. In yet another example, the random access message may be part of a third use case having a large payload where the random access message can additionally or alternatively include data (e.g., UP data for transmitting over physical uplink shared channel (PUSCH) resources and/or CP data for transmitting over physical uplink control channel (PUCCH)). In an example, the RRC state and/or use case associated with the random access message can be used in determining a format for a response message, as described further herein. In an additional or alternative example, a detection/decoding outcome (e.g., for the preamble portion and/or the payload portion) and/or indication of UE capabilities can be used in determining the format for the response message, as described further herein.

In one example, in transmitting the random access message to indicate RRC state (e.g., in the first use case), RA requesting component 252 can transmit the random access message with additional information, such as an international mobile subscriber identity (IMSI), serving temporary mobile subscriber identity (S-TMSI), resume identifier, or some other random values for identifying the UE 104, a cause of connection, resumption of connection, or establishment of connection, etc. For example, RA requesting component 252 can transmit the additional information in a common control channel (CCCH) portion of the random access message (e.g., in the payload). In an example, the CCCH can be associated with an identifier of the UE 104, such as the IMSI, S-TMSI, etc., and can be used for contention resolution at the base station 102 or other receiving entity in contention-based random access. In one example, RA requesting component 252 can also transmit at least a payload portion of the random access message using a low modulation and coding scheme (MCS) and low peak-to-average power ratio (PAPR) for PUSCH based on using a discrete Fourier transform (DFT) spread OFDM (DFT-s-OFDM) waveform with pi/2 binary phase shift keying (BPSK) or quadrature phase shift keying (QPSK), a cyclic prefix (CP)-OFDM waveform with BPSK/QPSK, etc.

In another example, in transmitting the random access message to indicate UE status report (e.g., in the second use case, which may also include the additional information from the first use case), RA requesting component 252 can transmit the random access message with additional information, such as a cell radio network temporary identifier (C-RNTI), an IMSI, S-TMSI, resume identifier, or some other random or pseudo-random values for identifying the UE 104. In this example, RA requesting component 252 can also transmit at least a payload portion to indicate the UE status report, such as BSR, PHR, UE capabilities, and/or QoS, etc.

In another example, in transmitting the random access message to indicate uplink UP/CP data (e.g., in the third use case), RA requesting component 252 can transmit the random access message with additional information, such as a C-RNTI, or some other random or pseudo-random values for identifying the UE 104. In this example, RA requesting component 252 can also transmit at least a payload portion to indicate the uplink data.

In method 500, at Block 502, the base station can receive a random access message. In an aspect, RA request processing component 352, e.g., in conjunction with processor(s) 312, memory 316, transceiver 302, scheduling component 342, etc., can receive the random access message (e.g., from UE 104). As described, RA request processing component 352 can receive the random access message over a random access occasion advertised by the base station 102. In addition, RA request processing component 352 can receive the random access message including a preamble portion and/or a payload portion, where the payload portion may be transmitted after a transmission gap in time from the preamble portion (e.g., where the transmission gap may be configured by the base station 102 for the UE 104), as described. As such, it is possible that the RA request processing component 352 can separately detect and/or decode the preamble portion and the payload portion. Thus, it is possible, in some cases, that the RA request processing component 352 detects and decodes the preamble portion but is unable to detect and decode the payload portion. It is also possible that the RA request processing component 352 does not detect and decode the preamble portion, in which case RA request processing component 352 may not process anything from the UE 104 at that time.

In method 500, optionally at Block 504, the base station can determine whether a payload portion is detected/decoded. In an aspect, RA request processing component 352, e.g., in conjunction with processor(s) 312, memory 316, transceiver 302, scheduling component 342, etc., can determine whether the payload portion (e.g., of the random access message) is detected and/or decoded. For example, RA request processing component 352 can receive the random access message from the UE 104 over random access channel time and frequency resources (e.g., as advertised in system information) and/or using one or more configured random access preambles. As described, the payload can include one or more of various types of messages depending on the use case (e.g., RRC state, UE status, uplink data, etc.).

Where the payload portion is detected and/or decoded at Block 504, optionally at Block 506, the base station can determine a format for a response message based at least in part on the RRC state and/or the use case of the UE associated with at least the payload portion of the random access message. In an aspect, response component 354, e.g., in conjunction with processor(s) 312, memory 316, transceiver 302, scheduling component 342, etc., can determine the format for the response message based at least in part on the RRC state and/or the use case of the UE associated with at least the payload portion of the random access message. For example, as described further herein, response component 354 can determine contents for the response message based on contents of, the use case associated with, the size of, etc., the payload portion of the message.

In one example, where the payload portion is detected and/or decoded at Block 504, optionally at Block 508, the base station can generate the response message, based on the format, to include downlink control information (DCI) and/or an identifier of the UE. In an aspect, response component 354, e.g., in conjunction with processor(s) 312, memory 316, transceiver 302, scheduling component 342, etc., can generate the response message, based on the format, to include the DCI and/or the identifier of the UE. For example, response component 354 can generate the response message to include at least a physical downlink control channel (PDCCH) transmission to indicate downlink resources over which the message is transmitted, and a physical downlink shared channel (PDSCH) that can include the response message. For example, response component 354 can transmit the downlink assignment for PDSCH over the PDCCH, where the DCI (or a cyclic redundancy check (CRC) of the DCI) can be masked or scrambled by a random access radio network temporary identifier (RA-RNTI) or modified RA-RNTI, which can be identified by the UE 104 and used to descramble the CRC and/or otherwise decode the PDCCH to determine contents thereof.

In an example, response component 354 can generate a response message to respond to random access messages from multiple UEs, and in this regard can include, in the PDSCH portion, identifiers for the UEs to indicate that the payload portion of the message is successfully detected/decoded. For example, the identifier may include an IMSI, S-TMSI, random access preamble identifiers (RAPIDs), etc., as described, to identify the UEs for which the random access message payload portion was detected/decoded (or the associated random access preamble). In this regard, the UE 104 can receive the response message and can determine whether the base station 102 received its random access message, as described further herein. Additionally, the identifiers or other information in the response message may include the contention resolution information the UE 104 can use to determine whether any contentions are resolved and access is granted to the base station 102.

In method 500, optionally at Block 510, the base station can determine whether a use case is for indicating RRC state. In an aspect, RA request processing component 352, e.g., in conjunction with processor(s) 312, memory 316, transceiver 302, scheduling component 342, etc., can determine whether the use case for the random access message corresponds to indicating an RRC state (e.g., indicating only the RRC state). For example, RA request processing component 352 can determine whether a use case is for indicating RRC state based at least in part on a size of the message being at or below a threshold size (e.g., 10 bytes), based at least in part on contents of the message, etc.

Where the use case is for RRC state at Block 510, optionally at Block 512, the base station can generate the response message to include a second identifier for the UE. In an aspect, response component 354, e.g., in conjunction with processor(s) 312, memory 316, transceiver 302, scheduling component 342, etc., can generate the response message to include the second identifier for the UE 104. For example, the second identifier may correspond to a C-RNTI for the UE 104 to use in transmitting subsequent uplink transmissions (e.g., in RRC_CONNECTED mode). For example, response component 354 can assign the C-RNTI to the UE 104 based on determining that the UE 104 does not have a valid C-RNTI and/or based on determining that subsequent uplink transmissions from the UE 104 are to occur in RRC_CONNECTED mode.

Where the use case is not for RRC state at Block 510, optionally at Block 514, the base station can determine whether the use case is for RRC state and status. In an aspect, RA request processing component 352, e.g., in conjunction with processor(s) 312, memory 316, transceiver 302, scheduling component 342, etc., can determine whether the use case of the random access message is for RRC state and UE status report (e.g., as opposed to only RRC state). As described, RA request processing component 352 can determine whether the use case is for RRC state and status based at least in part on a size of the message being within one or more threshold sizes (e.g., larger than RRC state only use case but smaller than payload use case, such as less than 100 bytes), based at least in part on contents of the message, etc.

Where the use case is for RRC state and status at Block 514, optionally at Block 516, the base station can generate the response message to include an uplink grant. In an aspect, response component 354, e.g., in conjunction with processor(s) 312, memory 316, transceiver 302, scheduling component 342, etc., can generate the response message to include the uplink grant for the UE 104 to transmit subsequent communications. For example, response component 354 can generate the uplink grant based on the UE status report (e.g., BSR, PHR, UE capability, QoS, etc.) to provide an amount of resources (e.g., resource blocks or other units of time and frequency resources) to transmit communications based on the UE status report. In one example, response component 354 may determine the uplink grant further based at least in part on the number of UEs whose random access message is detected/decoded and the contents of the status report of various UEs.

In addition, in this example where the use case is for RRC state and status at Block 514, the method may optionally proceed to Block 512 to generate the response message to include the second identifier for the UE, as described above. In this example, response component 354 may include the second identifier for the UE 104 where the UE 104 does not already have a valid C-RNTI.

In either case, where the use case for the random access message is RRC state only or also UE status, optionally at Block 518, the base station can generate the response message to also include a TA command, a PC command, or additional signaling information. In an aspect, response component 354, e.g., in conjunction with processor(s) 312, memory 316, transceiver 302, scheduling component 342, etc., can generate the response message to include the TA command, the PC command, or additional signaling information. In an example, the UE 104 can use this information to transmit subsequent uplink transmissions (e.g., for PUSCH), as described further herein. Where the use case for the random access message is different (e.g., for UP/CP data use case) the additional information may not be needed in the response message, as the uplink data has been transmitted in the payload.

Where the payload portion is not detected/decoded at Block 504, optionally at Block 520, the base station can generate a response message to include an identifier of the UE and an indication to retransmit at least the payload portion. In an aspect, response component 354, e.g., in conjunction with processor(s) 312, memory 316, transceiver 302, scheduling component 342, etc., can generate the response message to include the identifier of the UE and the indication to retransmit at least the payload portion. As described above, response component 354 can generate a PDCCH portion that carries the DL assignment for PDSCH (e.g., where the DCI, or an associated CRC portion, is scrambled by RA-RNTI) and the PDSCH portion. For example, response component 354 can include the indication to retransmit as part of ACK/NACK feedback for the random access message and/or ACK/NACK feedback for the payload portion. Moreover, the indication to retransmit may be one of an indication to retransmit the payload portion or to retransmit both the preamble portion and the payload portion of the random access message.

In one example, in generating the response message at Block 520, optionally at Block 522, the base station can generate the response message to include an uplink grant for retransmitting at least the payload portion. In an aspect, response component 354, e.g., in conjunction with processor(s) 312, memory 316, transceiver 302, scheduling component 342, etc., can generate the response message to include the uplink grant for retransmitting at least the payload portion. For example, the uplink grant may indicate a beam to use in retransmitting the random access message or portion thereof, frequency and/or time resources over which to retransmit the random access message or portion thereof, etc. In one example, the uplink grant may specify different beams to use for transmitting the preamble portion and for transmitting the payload portion, different frequency and/or time resources to use for transmitting the preamble portion and for transmitting the payload portion, and/or the like. In another example, however, base station 102 can indicate, in broadcast signaling (e.g., system information signaling and/or the like), retransmission information, which may include a beam, an indication of time and/or frequency resources, etc. to use in retransmitting the random access message.

In addition, in this example where the payload portion is not detected/decoded at Block 504, the method can optionally proceed to Block 518, where the base station can generate the response message to include a TA command, a PC command, or additional signaling information, as described above, where response component 354 can indicate the TA command, PC command, or additional signaling information to use in retransmitting the random access message or portion thereof, in transmitting subsequent uplink communications, and/or the like.

Moreover, for example, response component 354 can combine (e.g., concatenate) response messages for various UEs for transmission over a group-common PDCCH/PDSCH, or may map the response messages to different resources by time division multiplex (TDM), frequency division multiplexing (FDM), code division multiplexing (CDM), etc. In this regard, for example, response component 354 can scramble the response messages using an associated RA-RNTI, which can be used by the UEs to identify which response message is intended for a given UE (e.g., where the UE uses the RA-RNTI in transmitting the random access message). For example, the various response messages may include one or more response messages for one or more UEs 104 from which the preamble and payload portions of a random access message are successfully received, along with one or more response messages for one or more UEs 104 from which the preamble portion of a random access message is successfully received but the payload portion is not, and/or along with one or more response messages for one or more UEs 104 from which neither the preamble portion nor the payload portions of a random access message are successfully received, etc.

In any case, in method 500, at Block 524, the base station 102 can transmit a response message for the random access message, where the response message is formatted based at least in part on at least one of a use case associated with the random access message, whether the random access message is successfully received, or a RRC state. In an aspect, response component 354, e.g., in conjunction with processor(s) 312, memory 316, transceiver 302, scheduling component 342, etc., can transmit the response message for the random access message, e.g., which can have been formatted and generated based on at least one of the use case associated with the random access message, whether the random access message is successfully received, or a RRC state, as described above, to the UE 104.

Additionally, as described, the base station 102 can transmit multiple responses for multiple UEs in the response message. Thus, generating the response message at Block 508 and/or 520 (and/or Blocks 512, 516, 518, etc.) can include generating the response message to indicate responses for multiple UEs. In one example, response component 354 can generate the response message to include a PDCCH (and/or corresponding demodulation reference signal (DM-RS) with a single downlink assignment for all UEs, such that the corresponding PDSCH (and/or DM-RS) can include the responses as concatenated random access response and contention resolution messages for all UEs for which at least a preamble portion of the random access message is successfully detected/decoded.

In another example, response component 354 can split the response message into a first downlink assignment for PDCCH (and/or DM-RS) including the responses as concatenated random access response and contention resolution messages for all UEs for which the random access message is successfully detected/decoded in full (e.g., both preamble and payload portions), and a second downlink assignment for PDCCH (and/or DM-RS) including the responses as concatenated random access response and contention resolution messages for all UEs for which the random access message is partially successfully detected/decoded (e.g., preamble portion only), which may include retransmission information as described above.

In yet another example, response component 354 can split response messages for all UEs by mapping to different resources using time division multiplexing (TDM), frequency division multiplexing (FDM), code division multiplexing (CDM), and/or the like.

In method 400, at Block 404, the UE can receive a response message for the random access message, where the response message is formatted based at least in part on at least one of a use case associated with the random access message, whether the random access message is successfully received, or a RRC state. In an aspect, response processing component 254, e.g., in conjunction with processor(s) 212, memory 216, transceiver 202, communicating component 242, etc., can receive the response message (e.g., from the base station 102) for the random access message, where the response message is formatted based at least in part on at least one of a use case associated with (e.g., as indicated by, determined from, or otherwise) the random access message, whether the random access message is successfully received, or a RRC state. In one example, response processing component 254 can detect a transmission received over PDCCH, which may indicate PDSCH resources over which the response message is transmitted. For example, the PDCCH may indicate a downlink assignment for the PDSCH, as described, where DCI can be scrambled by RA-RNTI.

In one example, in receiving the response message at Block 404, optionally at Block 406, the UE can descramble a CRC of the DCI of the response message based on RA-RNTI. In an aspect, response processing component 254, e.g., in conjunction with processor(s) 212, memory 216, transceiver 202, communicating component 242, etc., can descramble the CRC of the DCI of the response message based on the RA-RNTI. In one example, response processing component 254 may determine the RA-RNTI based on information broadcasted by the base station 102.

Additionally, in receiving the response message at Block 404, optionally at Block 408, the UE can detect an identifier of the UE in contention resolution information of the response message. In an aspect, response processing component 254, e.g., in conjunction with processor(s) 212, memory 216, transceiver 202, communicating component 242, etc., can detect the identifier of the UE in contention resolution information of the response message (e.g., a contention resolution identifier). In one example, as described, the response message may include responses for multiple UEs and/or may split the responses into separate downlink assignments based on whether the random access message for the UE was received in full (e.g., preamble and payload) or preamble portion only. In any case, response processing component 254 can search one or more possible downlink assignments for a RNTI or other identifier of the UE. Moreover, in an example, the PDSCH portion including the responses can indicate identifiers of the UEs for which responses are successfully received (e.g., RAPIDs of successfully detected random access preamble portions of random access messages (and/or where the corresponding payload portion is also successfully detected). In this example, for instance, response processing component 254 may detect an identifier of the UE 104 in the contention resolution information of the response message to determine that the base station received the random access message from the UE 104.

As described, for example, Moreover, for example, base station 102 can combine (e.g., concatenate) response messages for various UEs for transmission over a group-common PDCCH/PDSCH, or may map the response messages to different resources by time division multiplex (TDM), frequency division multiplexing (FDM), code division multiplexing (CDM), etc. In this regard, for example, response processing component 254 can descramble the response messages using an associated RA-RNTI to determine which response message is intended for the UE 104.

In method 400, optionally at Block 410, the UE can determine a format of the response message based at least in part on at least one of the RRC state or the use case. In an aspect, response processing component 254, e.g., in conjunction with processor(s) 212, memory 216, transceiver 202, communicating component 242, etc., can determine the format of the response message based at least in part on at least one of the RRC state or the use case. In an example, the DCI can be selected by the base station 102 and/or indicated, as described above, based on the RRC state and/or use case. In another example, as described above, the base station 102 can determine a format for the response message based on the use case and/or the RRC state (and/or whether the random access message is successfully received). In one example, response processing component 254 may know or expect a certain response message format based on the specified RRC state and/or use case for the random access message.

Thus, for example, based on the examples described above, in method 400, optionally at Block 412, the UE can determine, from the response message and based on the format, a second identifier for the UE to use in subsequent transmissions. In an aspect, response processing component 254, e.g., in conjunction with processor(s) 212, memory 216, transceiver 202, communicating component 242, etc., can determine, from the response message and based on the format, the second identifier for the UE to use in subsequent transmissions. For example, response processing component 254 may receive and/or detect the second identifier where the use case relates to RRC state only or UE status (and/or where the preamble portion and payload portion of the random access message are both received), as described above. For example, as described further herein, the UE 104 can use the second identifier (e.g., a C-RNTI) in subsequent uplink data transmissions to the base station 102.

In addition, based on the examples described above, in method 400, optionally at Block 414, the UE can determine an uplink grant indicated in the response message. In an aspect, response processing component 254, e.g., in conjunction with processor(s) 212, memory 216, transceiver 202, communicating component 242, etc., can determine the uplink grant indicated in the response message. In an example, the uplink grant may be indicated in the response message based on the use case of the random access message, whether the random access message is successfully received, the RRC state indicated by the random access message, etc., as described above. For example, response processing component 254 can determine the uplink grant indicated in the response message where the use case relates to UE status (and/or where the preamble portion and payload portion of the random access message are both received), as described above, such that the uplink grant may enable the UE 104 to transmit uplink data to the base station 102 based on the reported UE status. Moreover, in one example, response processing component 254 can determine the uplink grant indicated in the response message as a grant to retransmit the random access message where the random access message is not fully detected at the base station 102 (e.g., where only the preamble portion is detected).

In addition, based on the examples described above, in method 400, optionally at Block 416, the UE can determine, from the response message and based on the format, at least one of a TA command, PC command, or additional signaling. In an aspect, response processing component 254, e.g., in conjunction with processor(s) 212, memory 216, transceiver 202, communicating component 242, etc., can determine, from the response message and based on the format, at least one of the TA command, PC command, or additional signaling. For example, communicating component 242 can use this information in transmitting subsequent transmissions to the base station 102 as well. For example, communicating component 242 can determine or adjust a timing advance to use in transmitting uplink communications based on the TA command. In another example, communicating component can adjust a transmit power used in transmitting the uplink communications based on the PC command.

In any case, in method 400, optionally at Block 418, the UE can transmit a subsequent transmission based on the response message. In an aspect, communicating component 242, e.g., in conjunction with processor(s) 212, memory 216, transceiver 202, etc., can transmit the subsequent transmission based on the response message. For example, communicating component 242 can transmit the subsequent transmission as subsequent uplink data communications over a PUSCH based on information that may be received in the response message, such as the received uplink grant, the received second identifier, the TA command, PC command, etc. In another example, RA requesting component 252 can transmit the subsequent transmission as a retransmission of the random access message, e.g., where the response message indicates to retransmit the random access message. In one example, as described, the response message may indicate a beam to use in retransmitting the random access message, time and/or frequency resources over which to retransmit the random access message, etc. In another example, RA requesting component 252 can determine the beam and/or retransmission resources based on broadcast signaling from the base station 102. In either case, communicating component 242 can retransmit the random access message using the beam and/or over the determined time and/or frequency resources for retransmission.

Figure 6:
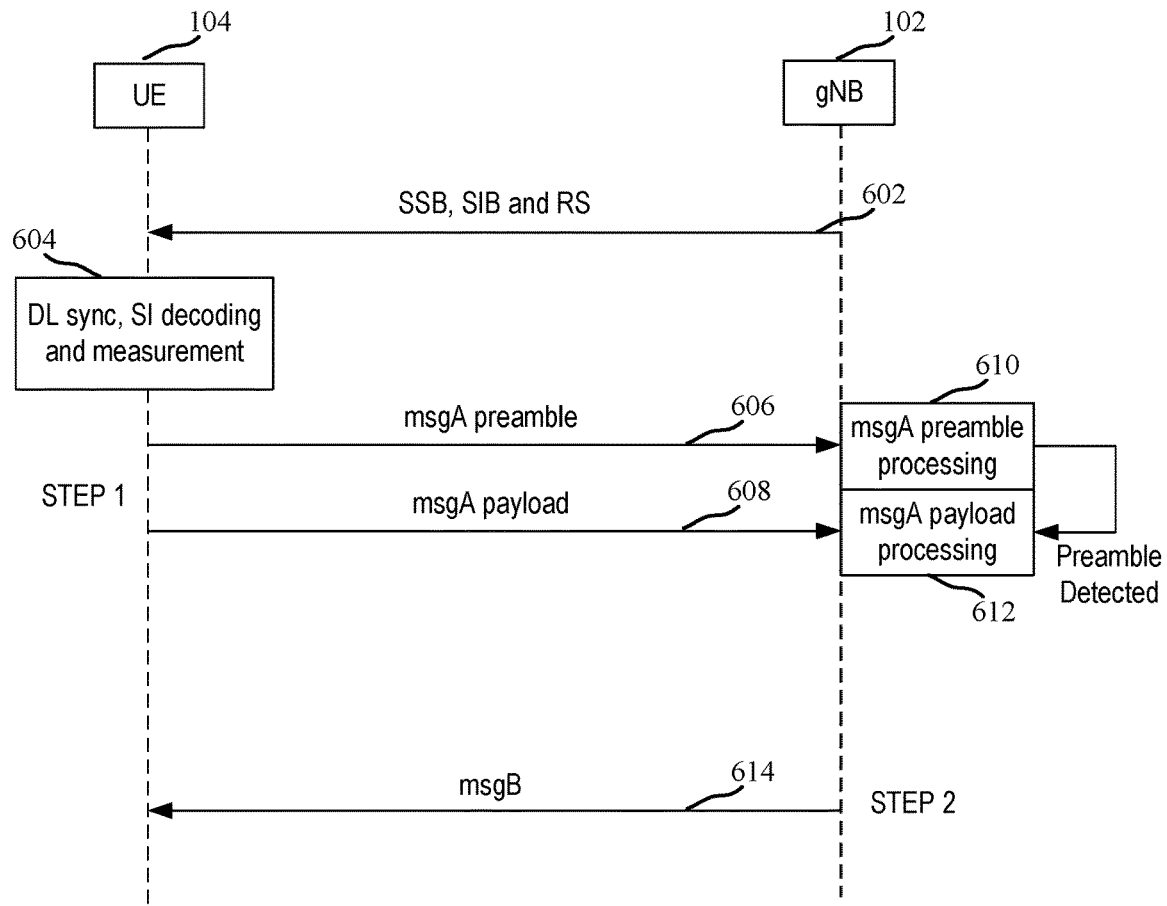
FIG. 6 illustrates an example of a system for transmitting random access messages, in accordance with various aspects of the present disclosure.

FIG. 6 illustrates an example of a system 600 for transmitting random access messages in a two-step random access procedure. Before starting two-step RACH, UE receives and processes SSB/SIB/RS from the serving gNB. For example, system 600 includes a UE 104 that can transmit random access messages to a gNB 102 for requesting connection establishment therewith. In this example, gNB 102 can transmit SSB, SIB, and RS 602. The UE 104 can perform downlink synchronization, system information decoding and measurements at 604. Based on the data in UE's 104 buffer, a UE-identifier and the system information, the UE 104 can generate a message A (msgA) and transmit it to gNB on a RACH occasion (RO) associated with a suitable SSB beam. The UE 104 can transmit msgA as a preamble portion 606 and a payload portion 608. After possibly receiving and processing msgA preamble/payload, gNB 102 can generate response message (e.g., msgB), which can be formatted based on the RRC state and use case of msgA, as well as based on a detection status of the msgA (e.g., detection/processing of a preamble portion at 610 and/or a payload portion at 612), as described herein. gNB 102 can transmit the msgB to UE 104 at 614.

Figure 7:
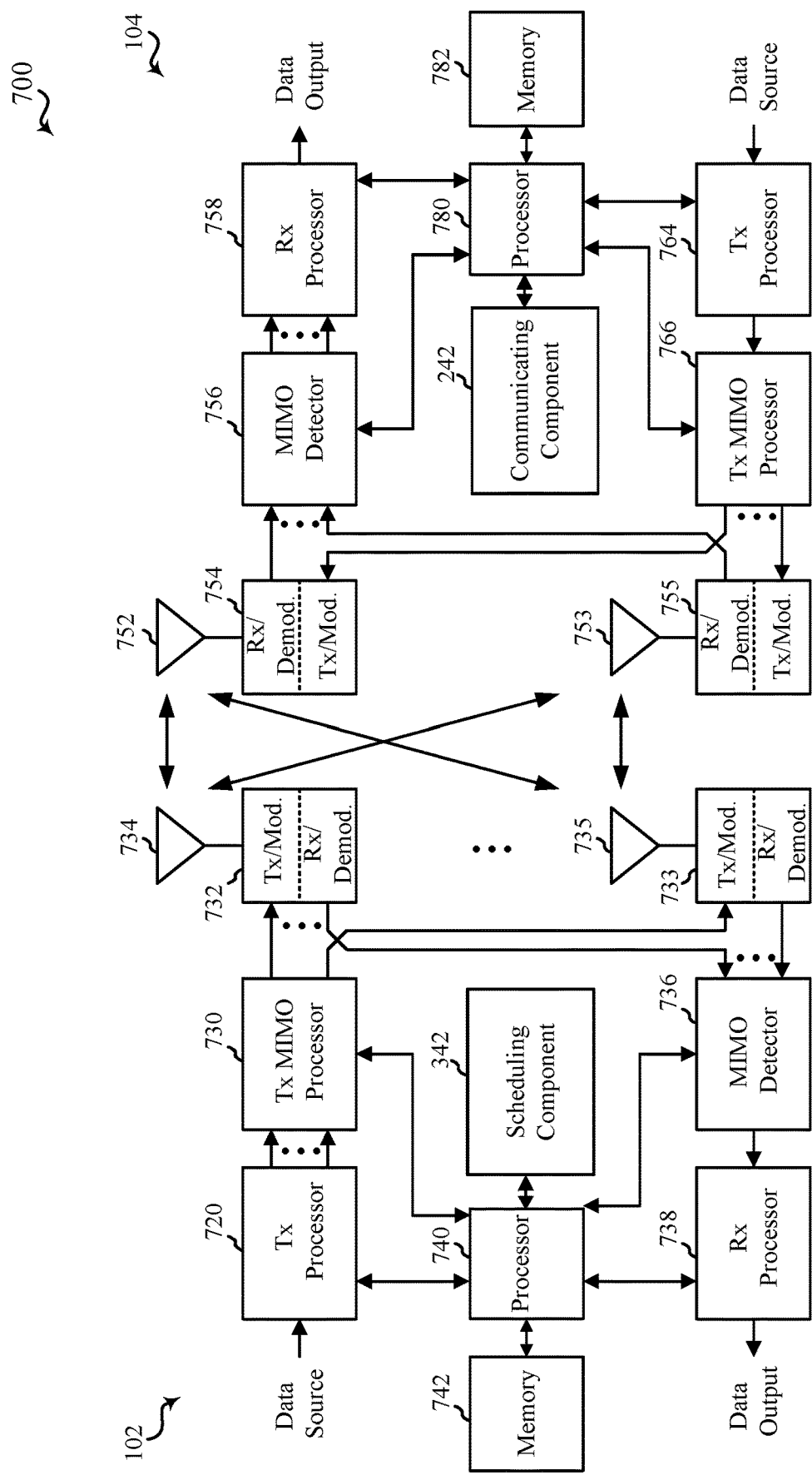
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, by a user equipment (UE), comprising:

transmitting, by the UE to a base station, a random access message in a two-step random access procedure; and receiving, from the base station, a response message for the random access message in the two-step random access procedure, wherein the response message is formatted based at least in part on a use case associated with the random access message and whether the random access message is successfully received.

2. The method of example 1, wherein the response message includes downlink control information including a downlink assignment for a downlink shared channel, and wherein a cyclic redundancy check (CRC) of the downlink control information is scrambled at least based on a random access identifier associated with the random access message sent by the UE.

3. The method of example 2, wherein the response message further includes, based on a detection status of a preamble portion and a payload portion of the random access message as being received by the base station, contention resolution information including at least an identifier of the UE.

4. The method of example 3, wherein the use case associated with the random access message corresponds to transmitting a RRC connection request and a status report, and wherein the response message further includes a second identifier for the user equipment to use in subsequent transmissions.

5. The method of example 4, wherein the response message further includes at least one of a timing advance command, a power control command, or additional signaling information.

6. The method of any of examples 3 to 5, wherein the payload portion of the random access message includes a common control channel associated with a different identifier of the UE to facilitate contention resolution.

7. The method of any of examples 1 to 6, wherein the response message includes, based on a detection status of at least one of a preamble portion of the random access message or a payload portion of the random access message as not being received by the base station, an identifier of a user equipment for which at least one of a preamble portion of the random access message or a payload portion of the random access message is not received, and an indication to retransmit at least one of the preamble portion or the payload portion.

8. The method of example 7, wherein the response message further includes an uplink grant for retransmitting at least one of the preamble portion or the payload portion.

9. The method of example 8, further comprising retransmitting at least one of the preamble portion or the payload portion of the random access message over resources assigned by the uplink grant.

10. The method of example 9, further comprising retransmitting at least the payload portion of the random access message over resources indicated in broadcast system information or dynamically granted resources signaled by the downlink control information from the base station.

11. The method of any of examples 7 to 10, wherein the response message further includes at least one of a timing advance command, a power control command, or additional signaling information.

12. A method for wireless communication, comprising:
receiving, from a user equipment (UE), a transmission of a random access message in a two-step random access procedure; and
transmitting, to the UE, a response message for the random access message in the two-step random access procedure, wherein the response message is formatted based at least in part on a use case associated with the random access message and whether the random access message is successfully received.

13. The method of example 12, further comprising:
generating the response message to include downlink control information including a downlink assignment for a downlink shared channel; and
scrambling a cyclic redundancy check (CRC) of the downlink control information based at least on a random access identifier.

14. The method of example 13, further comprising generating the response message to include, based on determining that a preamble portion and a payload portion of the random access message are received, an identifier of the user equipment.

15. The method of example 14, wherein the use case associated with the random access message corresponds to transmitting at least one of a RRC request or a status report, and further comprising generating the response message to include, based on the use case, a second identifier for the user equipment to use in subsequent transmissions.

16. The method of example 15, further comprising generating the response message to include at least one of a timing advance command, a power control command, or additional signaling information.

17. The method of any of examples 14 to 16, wherein the payload portion of the random access message includes a common control channel associated with a different identifier of the user equipment to facilitate contention resolution.

18. The method of any of examples 13 to 17, further comprising generating the response message to include, based on determining that at least one of a preamble portion or a payload portion of the random access message is not received, an identifier of a user equipment for which the preamble portion is received, and an indication to retransmit at least one of the preamble portion or the payload portion.

19. The method of example 18, further comprising generating the response message to include an uplink grant for retransmitting the payload portion or both the preamble portion and the payload portion.

20. The method of example 19, further comprising generating the response message to include at least one of a timing advance command, a power control command, or additional signaling information.

21. An apparatus for wireless communication, comprising:
a transceiver;
a memory configured to store instructions; and one or more processors communicatively coupled with the transceiver and the memory, wherein the one or more processors are configured to:
transmit, to a base station, a random access message in a two-step random access procedure; and
receive, from the base station, a response message for the random access message in the two-step random access procedure, wherein the response message is formatted based at least in part on a use case associated with the random access message and whether the random access message is successfully received.

22. The apparatus of example 21, wherein the response message includes downlink control information including a downlink assignment for a downlink shared channel, and wherein a cyclic redundancy check (CRC) of the downlink control information is scrambled at least based on a random access identifier associated with the random access message.

23. The apparatus of example 22, wherein the response message further includes, based on a detection status of a preamble portion and a payload portion of the random access message as being received by the base station, contention resolution information including at least an identifier of the apparatus.

24. The apparatus of example 23, wherein the use case associated with the random access message corresponds to transmitting a RRC connection request and a status report, and wherein the response message further includes a second identifier for the user equipment to use in subsequent transmissions.

25. The apparatus of example 24, wherein the response message further includes at least one of a timing advance command, a power control command, or additional signaling information.

26. The apparatus of any of examples 23 to 25, wherein the payload portion of the random access message includes a common control channel associated with a different identifier of the apparatus to facilitate contention resolution.

27. The apparatus of any of examples 21 to 26, wherein the response message includes, based on a detection status of at least one of a preamble portion of the random access message or a payload portion of the random access message as not being received by the base station, an identifier of a user equipment for which at least one of a preamble portion of the random access message or a payload portion of the random access message is not received, and an indication to retransmit at least one of the preamble portion or the payload portion.

28. The apparatus of example 27, wherein the response message further includes an uplink grant for retransmitting at least one of the preamble portion or the payload portion.

29. The apparatus of example 28, wherein the one or more processors are further configured to retransmit at least one of the preamble portion or the payload portion of the random access message over resources assigned by the uplink grant.

30. The apparatus of example 29, wherein the one or more processors are further configured to retransmit at least the payload portion of the random access message over resources indicated in broadcast system information or dynamically granted resources signaled by the downlink control information from the base station.

31. The apparatus of any of examples 27 to 31, wherein the response message further includes at least one of a timing advance command, a power control command, or additional signaling information.

32. An apparatus for wireless communication, comprising:
   a transceiver;
   a memory configured to store instructions; and
   one or more processors communicatively coupled with the transceiver and the memory, wherein the one or more processors are configured to:
      receive, from a user equipment (UE), a transmission of a random access message in a two-step random access procedure; and
      transmit, to the UE, a response message for the random access message in the two-step random access procedure, wherein the response message is formatted based at least in part on a use case associated with the random access message and whether the random access message is successfully received.

33. The apparatus of example 32, wherein the one or more processors are further configured to:
   generate the response message to include downlink control information including a downlink assignment for a downlink shared channel; and
   scramble a cyclic redundancy check (CRC) of the downlink control information based at least on a random access identifier.

34. The apparatus of example 33, wherein the one or more processors are further configured to generate the response message to include, based on determining that a preamble portion and a payload portion of the random access message are received, an identifier of the user equipment.

35. The apparatus of example 34, wherein the use case associated with the random access message corresponds to transmitting at least one of a RRC request or a status report, and wherein the one or more processors are further configured to generate the response message to include, based on the use case, a second identifier for the user equipment to use in subsequent transmissions.

36. The apparatus of example 35, wherein the one or more processors are further configured to generate the response message to include at least one of a timing advance command, a power control command, or additional signaling information.

37. The apparatus of any of examples 34 to 36, wherein the payload portion of the random access message includes a common control channel associated with a different identifier of the user equipment to facilitate contention resolution.

38. The apparatus of any of examples 33 to 37, wherein the one or more processors are further configured to generate the response message to include, based on determining that at least one of a preamble portion or a payload portion of the random access message is not received, an identifier of a user equipment for which the preamble portion is received, and an indication to retransmit at least one of the preamble portion or the payload portion.

39. The apparatus of example 38, wherein the one or more processors are further configured to generate the response message to include an uplink grant for retransmitting the payload portion or both the preamble portion and the payload portion.

40. The apparatus of example 39, wherein the one or more processors are further configured to generate the response message to include at least one of a timing advance command, a power control command, or additional signaling information.

41. An apparatus for wireless communication, comprising:
   means for transmitting, by the UE to a base station, a random access message in a two-step random access procedure; and
   means for receiving, from the base station, a response message for the random access message in the two-step random access procedure, wherein the response message is formatted based at least in part on a use case associated with the random access message and whether the random access message is successfully received.

42. The apparatus of example 41, wherein the response message includes downlink control information including a downlink assignment for a downlink shared channel, and wherein a cyclic redundancy check (CRC) of the downlink control information is scrambled at least based on a random access identifier associated with the random access message.

43. The apparatus of example 42, wherein the response message further includes, based on a detection status of a preamble portion and a payload portion of the random access message as being received by the base station, contention resolution information including at least an identifier of the apparatus.

44. The apparatus of example 43, wherein the use case associated with the random access message corresponds to transmitting a RRC connection request and a status report, and wherein the response message further includes at least one of a second identifier for the user equipment to use in subsequent transmissions, a timing advance command, a power control command, or additional signaling information.

45. The apparatus of any of examples 43 or 44, wherein the payload portion of the random access message includes a common control channel associated with a different identifier of the apparatus to facilitate contention resolution.

46. The apparatus of any of examples 41 to 45, wherein the response message includes, based on a detection status of at least one of a preamble portion of the random access message or a payload portion of the random access message as not being received by the base station, an identifier of a user equipment for which at least one of a preamble portion of the random access message or a payload portion of the random access message is not received, an indication to retransmit at least one of the preamble portion or the payload portion, an uplink grant for retransmitting at least one of the preamble portion or the payload portion.

47. The apparatus of example 46, further comprising retransmitting at least one of the preamble portion or the payload portion of the random access message over resources assigned by the uplink grant.

48. An apparatus for wireless communication, comprising:
means for receiving, from a user equipment (UE), a transmission of a random access message in a two-step random access procedure; and
means for transmitting, to the UE, a response message for the random access message in the two-step random access procedure, wherein the response message is formatted based at least in part on a use case associated with the random access message and whether the random access message is successfully received.

49. The apparatus of example 48, further comprising:
means for generating the response message to include downlink control information including a downlink assignment for a downlink shared channel; and
means for scrambling a cyclic redundancy check (CRC) of the downlink control information based at least on a random access identifier.

50. The apparatus of example 49, further comprising generating the response message to include, based on determining that a preamble portion and a payload portion of the random access message are received, an identifier of the user equipment.

51. The apparatus of any of examples 49 or 50, further comprising generating the response message to include, based on determining that at least one of a preamble portion or a payload portion of the random access message is not received, an identifier of a user equipment for which the preamble portion is received, an indication to retransmit at least one of the preamble portion or the payload portion, or an uplink grant for retransmitting the payload portion or both the preamble portion and the payload portion.

52. A computer-readable medium, comprising code executable by one or more processors for wireless communication by a user equipment (UE), the code comprising code for:
transmitting, by the UE to a base station, a random access message in a two-step random access procedure; and
receiving, from the base station, a response message for the random access message in the two-step random access procedure, wherein the response message is formatted based at least in part on a use case associated with the random access message and whether the random access message is successfully received.

53. The computer-readable medium of example 52, wherein the response message includes downlink control information including a downlink assignment for a downlink shared channel, and wherein a cyclic redundancy check (CRC) of the downlink control information is scrambled at least based on a random access identifier associated with the random access message sent by the UE.

54. The computer-readable medium of example 53, wherein the response message further includes, based on a detection status of a preamble portion and a payload portion of the random access message as being received by the base station, contention resolution information including at least an identifier of the UE.

55. The computer-readable medium of example 54, wherein the use case associated with the random access message corresponds to transmitting a RRC connection request and a status report, and wherein the response message further includes at least one of a second identifier for the user equipment to use in subsequent transmissions, a timing advance command, a power control command, or additional signaling information.

56. The computer-readable medium of any of examples 54 or 55, wherein the payload portion of the random access message includes a common control channel associated with a different identifier of the UE to facilitate contention resolution.

57. The computer-readable medium of any of examples 52 to 56, wherein the response message includes, based on a detection status of at least one of a preamble portion of the random access message or a payload portion of the random access message as not being received by the base station, an identifier of a user equipment for which at least one of a preamble portion of the random access message or a payload portion of the random access message is not received, an indication to retransmit at least one of the preamble portion or the payload portion, an uplink grant for retransmitting at least one of the preamble portion or the payload portion.

58. The computer-readable medium of example 57, further comprising retransmitting at least one of the preamble portion or the payload portion of the random access message over resources assigned by the uplink grant.

59. A computer-readable medium, comprising code executable by one or more processors for wireless communication, the code comprising code for:
receiving, from a user equipment (UE), a transmission of a random access message in a two-step random access procedure; and
transmitting, to the UE, a response message for the random access message in the two-step random access procedure, wherein the response message is formatted based at least in part on a use case associated with the random access message and whether the random access message is successfully received.

60. The computer-readable medium of example 59, further comprising:
code for generating the response message to include downlink control information including a downlink assignment for a downlink shared channel; and
code for scrambling a cyclic redundancy check (CRC) of the downlink control information based at least on a random access identifier.

61. The computer-readable medium of example 60, further comprising generating the response message to include, based on determining that a preamble portion and a payload portion of the random access message are received, an identifier of the user equipment.

62. The computer-readable medium of any of examples 60 or 61, further comprising generating the response message to include, based on determining that at least one of a preamble portion or a payload portion of the random access message is not received, an identifier of a user equipment for which the preamble portion is received, an indication to retransmit at least one of the preamble portion or the payload portion, or an uplink grant for retransmitting the payload portion or both the preamble portion and the payload portion.

What is claimed is:

1. A method for wireless communication, by a user equipment (UE), comprising:
    transmitting, by the UE to a base station, a random access message that includes a common control channel associated with a first identifier of the UE; and
    receiving, from the base station, a response message responsive to the random access message, wherein the response message is in a first format or a second format depending on whether at least a portion of the random access message is to be retransmitted,
    wherein the first format includes contention resolution information, indicating the first identifier, and a cell radio network temporary identifier (C-RNTI),
    wherein the second format is associated with a cyclic redundancy check (CRC) scrambled by a second identifier, different from the C-RNTI and different from the first identifier, the second format instructing the UE to retransmit at least the portion of the random access message.

2. The method of claim 1, wherein the response message in the first format comprises downlink control information that includes a downlink assignment for a downlink shared channel, and wherein a cyclic redundancy check (CRC) of the downlink control information is scrambled at least based on the C-RNTI.

3. The method of claim 1, wherein the response message in the second format further comprises at least one of an uplink grant, a timing advance, or a random access preamble identifier (RAPID).

4. The method of claim 1, wherein a use case associated with the random access message corresponds to transmitting a RRC connection request and a status report, wherein the response message is formatted to be in the first format or the second format further based at least in part on the use case.

5. The method of claim 1, wherein the response message in the first format further includes at least one of a power control command or additional signaling information.

6. The method of claim 1, wherein a payload portion of the random access message includes the common control channel.

7. The method of claim 1, wherein transmitting the random access message is part of a two-step random access procedure, and wherein the random access message includes a preamble portion and a payload portion.

8. The method of claim 7, wherein the response message in the second format instructing the UE to retransmit at least one of the preamble portion or the payload portion.

9. The method of claim 8, further comprising retransmitting at least one of the preamble portion or the payload portion of the random access message over resources assigned by uplink grant in the response message.

10. The method of claim 9, further comprising retransmitting at least the payload portion of the random access message over resources indicated in broadcast system information or dynamically granted resources signaled by downlink control information from the base station.

11. The method of claim 7, wherein the response message in the second format further includes at least one of a power control command or additional signaling information.

12. The method of claim 1, wherein the response message is formatted to be in the first format or the second format further based at least in part on content of the random access message.

13. An apparatus for wireless communication, comprising:
    a transceiver;
    a memory configured to store instructions; and
    one or more processors communicatively coupled with the transceiver and the memory, wherein the one or more processors are configured to:
        transmit, to a base station, a random access message that includes a common control channel associated with a first identifier of the apparatus; and
        receive, from the base station, a response message responsive to the random access message, wherein the response message is in a first format or a second format depending on whether at least a portion of the random access message is to be retransmitted,
        wherein the first format includes contention resolution information, indicating the first identifier, and a cell radio network temporary identifier (C-RNTI),
        wherein the second format is associated with a cyclic redundancy check (CRC) scrambled by a second identifier, different from the C-RNTI and different from the first identifier, the second format instructing the apparatus to retransmit at least a portion of the random access message.

14. The apparatus of claim 13, wherein the response message in the first format comprises downlink control information that includes a downlink assignment for a downlink shared channel, and wherein a cyclic redundancy check (CRC) of the downlink control information is scrambled at least based on the C-RNTI.

15. The apparatus of claim 13, the response message in the second format further comprises at least one of an uplink grant, a timing advance, or a random access preamble identifier (RAPID).

16. The apparatus of claim 13, wherein a use case associated with the random access message corresponds to transmitting a RRC connection request and a status report, wherein the response message is formatted to be in the first format or the second format further based at least in part on the use case.

17. The apparatus of claim 13, wherein the response message in the first format further includes at least one of a power control command or additional signaling information.

18. The apparatus of claim 13, wherein a payload portion of the random access message includes the common control channel.

19. The apparatus of claim 13, wherein transmitting the random access message is part of a two-step random access procedure, and wherein the random access message includes a preamble portion and a payload portion.

20. The apparatus of claim 19, wherein the response message in the second format instructing the apparatus to retransmit at least one of the preamble portion or the payload portion.

21. The apparatus of claim 20, wherein the one or more processors are further configured to retransmit at least one of the preamble portion or the payload portion of the random access message over resources assigned by an uplink grant in the response message.

22. The apparatus of claim 21, wherein the one or more processors are further configured to retransmit at least the payload portion of the random access message over resources indicated in broadcast system information or dynamically granted resources signaled by downlink control information from the base station.

23. The apparatus of claim 19, wherein the response message in the second format further includes at least one of a power control command or additional signaling information.

24. An apparatus for wireless communication, comprising:
- means for transmitting, to a base station, a random access message that includes a common control channel associated with a first identifier of the apparatus; and
- means for receiving, from the base station, a response message responsive to the random access message, wherein the response message is in a first format or a second format depending on whether at least a portion of the random access message is to be retransmitted,
- wherein the first format includes contention resolution information, indicating the first identifier, and a cell radio network temporary identifier (C-RNTI),
- wherein the second format is associated with a cyclic redundancy check (CRC) scrambled by a second identifier, different from the C-RNTI and different from the first identifier, the second format instructing the apparatus to retransmit at least a portion of the random access message.

25. The apparatus of claim 24, wherein the response message in the first format comprises downlink control information that includes a downlink assignment for a downlink shared channel, and wherein a cyclic redundancy check (CRC) of the downlink control information is scrambled at least based on the C-RNTI.

26. The apparatus of claim 24, the response message in the second format further comprises at least one of an uplink grant, a timing advance, or a random access preamble identifier (RAPID).

27. The apparatus of claim 24, wherein a use case associated with the random access message corresponds to transmitting a RRC connection request and a status report, wherein the response message is formatted to be in the first format or the second format further based at least in part on the use case, and wherein the response message further includes at least one of a power control command or additional signaling information.

28. A non-transitory computer-readable medium, comprising code executable by one or more processors for wireless communication by a user equipment (UE), the code comprising code for:
- transmitting, by the UE to a base station, a random access message that includes a common control channel associated with a first identifier of the UE; and
- receiving, from the base station, a response message responsive to the random access message, wherein the response message is in a first format or a second format depending on whether at least a portion of the random access message is to be retransmitted,
- wherein the first format includes contention resolution information, indicating the first identifier, and a cell radio network temporary identifier (C-RNTI),
- wherein the second format is associated with a cyclic redundancy check (CRC) scrambled by a second identifier, different from the C-RNTI and different from the first identifier, the second format instructing the UE to retransmit at least a portion of the random access message.

29. The non-transitory computer-readable medium of claim 28, wherein the response message in the first format comprises downlink control information that includes a downlink assignment for a downlink shared channel, and wherein a cyclic redundancy check (CRC) of the downlink control information is scrambled at least based on the C-RNTI.

30. The non-transitory computer-readable medium of claim 28, the response message in the second format further comprises at least one of an uplink grant, a timing advance, or a random access preamble identifier (RAPID).

31. The non-transitory computer-readable medium of claim 28, wherein a use case associated with the random access message corresponds to transmitting a RRC connection request and a status report, wherein the response message is formatted to be in the first format or the second format further based at least in part on the use case, and wherein the response message further includes at least one of a power control command or additional signaling information.

* * * * *